UNITED STATES PATENT OFFICE.

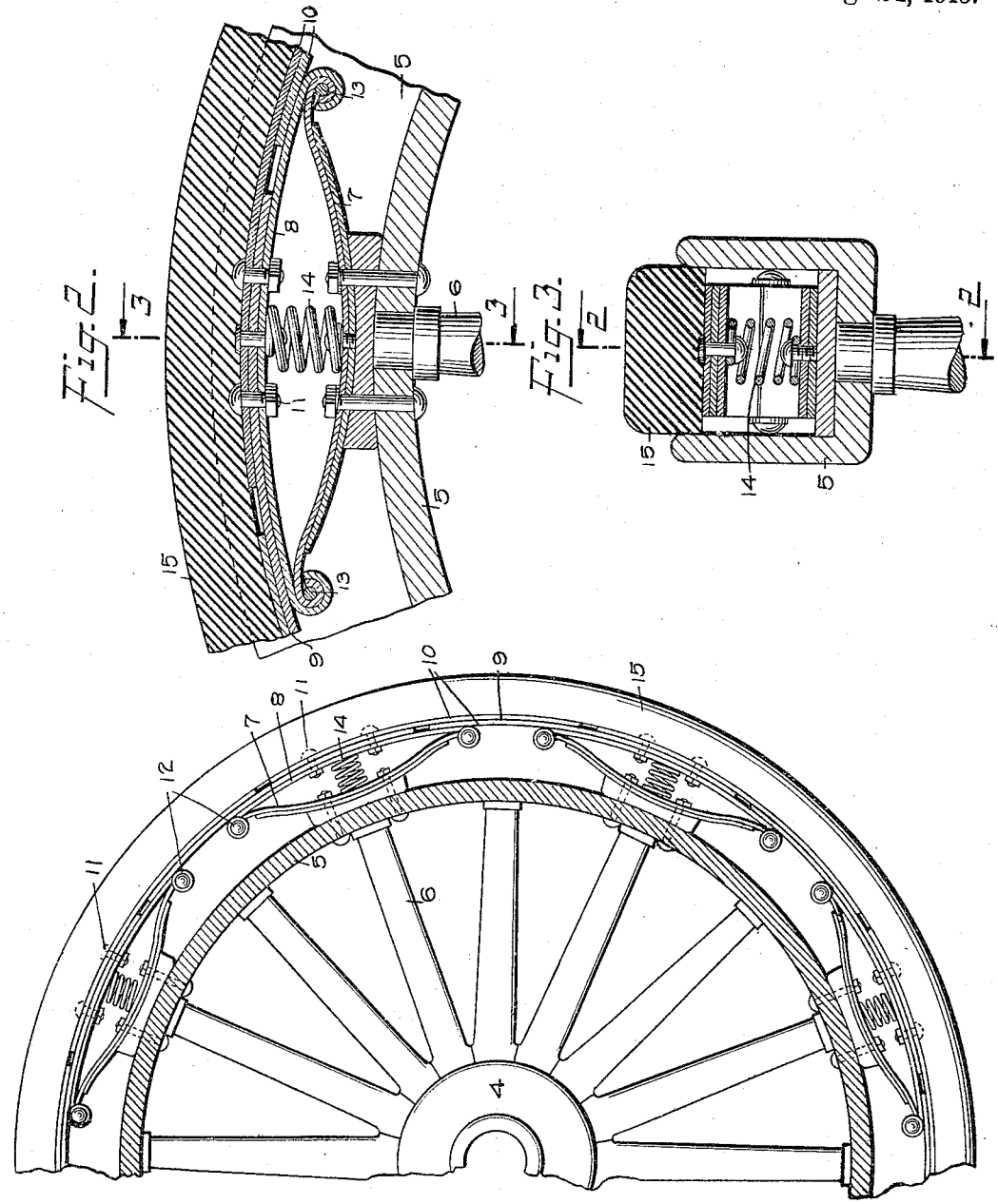

HENRY HAUS, OF POPE VALLEY, CALIFORNIA.

RESILIENT TIRE.

1,151,462.  Specification of Letters Patent.  Patented Aug. 24, 1915.

Application filed May 18, 1915. Serial No. 28,856.

*To all whom it may concern:*

Be it known that I, HENRY HAUS, a citizen of the United States, and a resident of Pope Valley, in the county of Napa and State of California, have invented a new and Improved Resilient Tire, of which the following is a full, clear, and exact description.

My invention relates to resilient tires of the non-pneumatic type.

The object of the invention is to provide a simple, strong, inexpensive and efficient resilient tire which will respond readily and uniformly to variation of loads thereon that may be caused by the unevenness of the road or sudden obstacles that may come across the wheel.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation, partly in section, of a fragment of my wheel; Fig. 2 is a section through the resilient portion of the wheel on line 2—2, Fig. 3; and Fig. 3 is a cross section through the resilient portion of the wheel on line 3—3, Fig. 2.

Referring to the drawings, 4 represents the hub, which is connected to a felly 5 by rigid spokes 6. The felly 5 is preferably U-shaped in cross section. Secured to the bottom of the felly 5 at suitable intervals are the lower leaves 7 of an elliptical spring, the upper leaf 8 of the spring being secured to a sectional rim 9 formed of an inner and outer series of spaced plates 10, the two series being staggered. The inner and outer plates 10 are made to overlap symmetrically with respect to the elliptical springs. The overlapping ends of the plates located above each upper leaf 8 of the elliptical spring are secured to each other and to the leaves by bolts 11. The ends 12 of the elliptical spring bear against the overlapping ends of the plates which are not secured, as can be seen from the drawings. The said ends 12 of the elliptical spring are interlocked by bending the ends of the upper leaf 8 about the bent end of the lower leaf, the ends of the leaves being further reinforced by a central member 13. It may be said that the end of the lower leaf bears in the end of the upper leaf in each elliptical spring. Located between the upper and lower leaves of each spring and central therewith is a coil spring 14, the ends of the spring 14 being secured to the upper and lower leaves by any suitable means to prevent said spring from moving laterally therebetween. Engaging the outer plates 10 of the sectional rim 9 is a rubber shoe 15 which partially extends between the sides of the U-shaped felly, and which maintains its engagement with the sides of the felly under the maximum displacement of the resilient means within said U-shaped member. This shoe protects the parts from dirt and dust, as it is snugly fitted into said U-shaped member.

By forming the rim 9 of two series of spaced, overlapping plates, a more uniform distribution of the load on the elliptical springs is obtained. That is to say, if a sudden shock is applied under one of the elliptical springs, the sectional rim 9 formed of the plates 10 will at once distribute a large part of the shock to the adjacent elliptical spring, thereby relieving each of the elliptical springs from an excessive strain.

I claim:

1. In combination, a hub, a felly U-shape in cross section, spokes from the hub to the felly, a rim formed of an inner and outer contacting series of spaced plates, the plates of the two series being staggered and located between the sides of the U-shaped felly, elliptical springs interposed between the rim and the felly, and a rubber shoe engaging the rim and projecting out of said felly.

2. In combination, a hub, a felly U-shape in cross section, spokes from the hub to the felly, a rim formed of an outer and inner contacting series of spaced plates, the plates of said series being staggered, elliptical springs interposed between the felly and the rim, means connecting the alternately overlapping ends of the plates with the elliptical springs, the ends of said elliptical springs being adapted to bear against the non-connected ends of the plates, a coil spring in each elliptical spring between the upper and lower leaves thereof, and a shoe associated with the rim and projecting out of the felly.

In testimony whereof I have signed my name to this specification in the presence of two subscribing witnesses.

HENRY HAUS.

Witnesses:
L. B. PALMER,
C. A. JACKSON.

Copies of this patent may be obtained for five cents each, by addressing the "Commissioner of Patents, Washington, D. C."